United States Patent
Zou et al.

(10) Patent No.: US 11,958,748 B2
(45) Date of Patent: Apr. 16, 2024

(54) 3D REDUCED GRAPHENE OXIDE/SiO$_2$ COMPOSITE FOR ICE NUCLEATION

(71) Applicant: Khalifa University of Science and Technology, Abu Dhabi (AE)

(72) Inventors: Linda Zou, Abu Dhabi (AE); Haoran Liang, Abu Dhabi (AE)

(73) Assignee: Khalifa University of Science and Technology, Abu Dhabi (AE)

( * ) Notice: Subject to any disclaimer, the term of this patent is extended or adjusted under 35 U.S.C. 154(b) by 401 days.

(21) Appl. No.: 17/422,994

(22) PCT Filed: Jan. 14, 2020

(86) PCT No.: PCT/IB2020/050259
§ 371 (c)(1),
(2) Date: Jul. 14, 2021

(87) PCT Pub. No.: WO2020/148644
PCT Pub. Date: Jul. 23, 2020

(65) Prior Publication Data
US 2022/0002159 A1    Jan. 6, 2022

Related U.S. Application Data

(60) Provisional application No. 62/791,927, filed on Jan. 14, 2019.

(51) Int. Cl.
*C01B 32/198* (2017.01)
*C01B 33/12* (2006.01)
*B82Y 40/00* (2011.01)

(52) U.S. Cl.
CPC ............ *C01B 32/198* (2017.08); *C01B 33/12* (2013.01); *B82Y 40/00* (2013.01); *C01B 2204/24* (2013.01);

(Continued)

(58) Field of Classification Search
CPC ....... C01B 32/198; C01B 33/12; C01B 33/00; C01B 33/18; C01B 2204/24;
(Continued)

(56) References Cited

U.S. PATENT DOCUMENTS 5,261,245 A    11/1993  Tanaka et al.
5,628,455 A *  5/1997  Fukuta .................. A01G 15/00
                                                        239/2.1

(Continued)

FOREIGN PATENT DOCUMENTS

CN    104098089 A    10/2014
CN    108246130 A     7/2018
(Continued)

OTHER PUBLICATIONS

Biggs et al, Impact of sequential surface-modification of graphene oxide on ice nucleation, Phys. Chem. Chem. Phys. 2017, 19, 21929-21932 (Year: 2017).*

(Continued)

*Primary Examiner* — Emmanuel E Duke
(74) *Attorney, Agent, or Firm* — Billion & Armitage

(57) ABSTRACT

The present invention provides for an ice-nucleating particle for cloud seeding and other applications, which can initiate ice nucleation at a temperature of −8° C. Further, the ice nucleation particle number increased continuously and rapidly with the reducing of temperature. The ice nucleating particle in the present invention is a nanostructured porous composite of 3-dimensional reduced graphene oxide and silica dioxide nanoparticles (PrGO-SN). The present invention also provides for a process for synthesizing the PrGO-SN.

17 Claims, 11 Drawing Sheets

(52) U.S. Cl.
CPC ...... *C01B 2204/32* (2013.01); *C01P 2004/64* (2013.01)

(58) Field of Classification Search
CPC . C01B 2204/32; C01B 2204/64; B82Y 40/00; B82Y 30/00; C01P 2004/64; C01P 2006/12; C01P 2006/14; C01P 2006/16; C01P 2006/90; A01G 15/00
See application file for complete search history.

(56) References Cited

U.S. PATENT DOCUMENTS

| | | | |
|---|---|---|---|
| 8,516,846 B2 | 8/2013 | Lee et al. | |
| 2016/0310908 A1* | 10/2016 | Yu | B01D 61/243 |
| 2017/0206997 A1* | 7/2017 | Al-Harthi | C08J 5/18 |
| 2018/0076404 A1 | 3/2018 | Cho et al. | |

FOREIGN PATENT DOCUMENTS

| | | | | |
|---|---|---|---|---|
| CN | 108862265 | A | 11/2018 | |
| CN | 109777358 | A * | 5/2019 | |
| FR | 3051098 | A1 | 11/2017 | |
| IT | 1244678 | B * | 8/1994 | ............ A01G 15/00 |
| RU | 2523470 | C2 | 7/2014 | |
| WO | 2017041171 | A1 | 3/2017 | |
| WO | 2018112575 | A1 | 6/2018 | |

OTHER PUBLICATIONS

Wang et al., Facile electrostatic self-assembly of silicon/reduced graphene oxide porous composite by silica assist as high performance anode for Li-ion battery; Elesevier, Applied Surface Science 456 (2018) 379-389. (Year: 2018).*

Sun et al., Graphene oxide-silver nanoparticle membrane; Elesevier, Chemical Engineering Journal 281 (2015), 53-59. (Year: 2015).*

Murali et al. Ultracapacitor Performance of Reduced Graphene Oxide-Silica Composite, ECS Transactions, 33 (27) 99-104. (Year: 2011).*

Wu et al., Three-dimensional graphene nanosheets loaded with Si nanoparticles by in situ reduction of SiO2 for lithium ion batteries; Elesevier, Electrochimica Acta 190 (2016) 628-635. (Year: 2016).*

Communication pursuant to Rules 70(2) and 70a(2) EPC Mailed on Oct. 10, 2022, 1 Page.

Extended European Search Report for EP Application No. 20742030. 8, mailed on Sep. 20, 2022.

Zheng Yi, et al., "Room-Temperature Ice Growth on Graphite Seeded by Nano-Graphene Oxide", Angewandte Chemie International Edition, vol. 52, No. 33, Aug. 12, 2013 (Aug. 12, 2013), pp. 8708-8712, XP055959201, ISSN: 1433-7851, DOI: 10.1002/anie. 201302608 * figures 1-4 *, 08-12 Pages.

"First Office Action Received mailed on Jun. 29, 2023", 21 Pages.

Meng, Jingke, et al., "Facile Fabrication of 3D SiO2@Graphene Aerogel Composites as Anode Material for Lithium Ion Batteries", Electrochimica Acta, Jul. 29, 2015, 1001-1009.

Yi, Guiyun, et al., "One-Step Synthesis of Hierarchical Micro-Mesoporous SiO2/Reduced Graphene Oxide Nanocomposites for Adsorption of Aqueous Cr(VI)", Guiyun Yi et al., Journal of Nanomaterials, vol. 2017, pp. 1-10, Jul. 24, 2017, 1-10.

Zhou, Xun, et al., "One-pot hydrothermal synthesis of a mesoporous SiO2-graphene hybrid with tunable surface area and pore size", Jul. 24, 2012, 566-573.

Search Report and Written Opinion for PCT Application No. PCT/IB2020/050259 mailed on Apr. 30, 2020.

Ganguly, Mainak, et al., "Purely Inorganic Highly Efficient Ice Nucleating Particle", 12 pages.

* cited by examiner

3D REDUCED GRAPHENE OXIDE/SiO$_2$ COMPOSITE FOR ICE NUCLEATION

FIELD OF THE INVENTION

The present invention relates to the field of cloud seeding. More particularly, the present invention relates to the synthesis of 3D graphene/metal oxide nanostructured composite materials for ice nucleation in cloud seeding, artificial snow making and freeze-drying technologies in biomedical and the food industry and the like.

BACKGROUND OF THE INVENTION

The freezing of liquid water into solid ice is one of the most common natural phenomena, where ice can be formed homogeneously by pure water or heterogeneously in the presence of foreign materials called ice nucleating particles (INPs). Such INPs can originate from biological, mineralogical and anthropogenic sources, including pollen and bacteria, volcano ashes, atmospheric dust. Heterogeneous ice nucleation plays an important role in various areas, such as atmospheric physics, cryopreservation technologies, and freeze-drying in biomedical research and the food industry. For decades, although the extent to which exact properties of INPs are responsible for initiating ice nucleation and their molecular identity still remains unclear, surface properties of INPs have been considered as the main parameters that promote ice nucleating activities. A variety of mechanisms that attempt to describe the ice nucleating activities of INPs are hypothesized in the literature, most of which are focused on the discussions about the roles of INPs surface properties. For instance, previous experimental and numerical studies show that surface defects (such as cracks and cavities present in K-feldspar) as well as surface functionalization (such as hydroxyl groups present on edge sites of aluminosilicate clay minerals) may induce heterogeneous ice nucleation; the lattice match between ice and the crystalline structure of the surface can also influence the ice nucleating activities, as is the case for silver iodide (AgI), a known cold cloud seeding agent which has similar lattice constant with that of ice crystal.

The existing ice nucleation particles (INPs) used in cloud seeding applications mainly involve silver iodide (AgI), where ice nucleation occurs selectively at specific locations, such as defect sites and lattice mismatches. It was found that defect sites are favorable locations for ice nucleation rather than perfect faces of AgI crystals. Moreover, the structures of some of the most efficient ice nucleating substances closely match the ice hexagonal lattice. However, despite its good ice nucleating ability, AgI requires much lower temperature (−25° C.) to exhibit good ice-nucleating ability, in addition, it is associated with controversial environmental risk. Although there are other materials that contain favorable defect sites and similar lattice structure with ice, most of them exhibit high ice-nucleating activity only at low temperature.

Another effective INPs reported in recent years is so-called ice-active bacteria, *Pseudomonas syringae*, that is often used to facilitate artificial snow production in winter sports areas around the world. Similar to AgI, its ice-nucleating ability comes from the ice mimicry of the ice nucleation sites, which serves as a template for orienting water into a lattice. However, they only display an initial high ice nucleation counts and cannot further increase the numbers with the reduced temperature. In addition, such bacteria-based materials demand high cost for mass production and are not widely used for cloud seeding applications at present.

In addition, surface charge, surface geometry, hydrogen bonding and other surface characteristics are also hypothesized to contribute to the surface-induced ice nucleation. However, studies on ice nucleating activities of INPs are mostly limited to theoretical modelling and simulations, mainly due to the challenges in providing the suitable experimental setup, such as observation and measurement techniques that work at subzero temperature conditions, all of which have significantly restricted observation of the interaction between water vapor and the ice nucleation particles, and led to lack of information on the inception of ice nucleation and progression of ice crystal growth.

In addition to the above mentioned INPs that have been explored in the literature, various materials are also found to promote ice nucleation, among which carbon nanomaterials such as graphene and its derivatives have been investigated due to their intrinsic and functionalized surface properties. Specifically, the triangular sub lattice of graphite (2.46 Angstrom) matches the natural ice structure, which could favor the epitaxial growth of the stable hexagonal ice I$_h$ at the atomic level.

Graphene derivatives such as graphene oxide (GO) also exhibit ice nucleating abilities because water molecules can be efficiently captured by various hydrophilic oxygen-contained functional groups that exist on GO. Immersion droplet freezing experiments has been employed in the literature to indirectly measure the ice nucleating abilities of materials by counting the number of microscale frozen droplets, but most of the ice nucleation activities of carbon nanomaterials were only observed at relatively low temperature (usually below −20° C.), which is less ideal than other ice nucleation materials such as K-feldspar and silver iodide (AgI) with higher nucleation temperature, and the real-time progress of ice growth is not captured. As a result, in situ observation of ice nucleation on these carbon nanomaterials is less known.

It has been reported that atmospheric ice particles play a crucial role in cloud formation and precipitation, and most precipitation in clouds initiates via the ice phase. Recently, studies on cloud seeding have been attracting more attentions because it is an effective method to take advantage of such water resources in clouds. Most studies focus on hygroscopic materials with high water vapor adsorbing capabilities as potential cloud seeding materials, and they are only effective at above-zero temperatures. However, studies on cloud seeding at subzero temperature (cold cloud seeding) have not seen much progress, with AgI as the most commonly used cold cloud seeding materials for decades, which is often associated with controversial environmental risk.

Use of chemicals such as silver iodide pose an ecological threat and harm to public health as silver iodide can cause temporary incapacitation or possible residual injury to humans and mammals with intense or chronic exposure. Current silver iodide micro particles used in cloud seeding have raised concerns over its toxicity in different environments; particularly aquatic environments. In addition, although the conventional method of cloud seeding has been shown to change the shape and behavior of clouds, its ability to induce rain is much uncertain. Furthermore, the structure of ice is not well understood at the nanoscale. Recent studies have proven that ice at the nanoscale has a crystalline structure that is pentagonal rather than hexagonal, opening the door for new and potentially more effective chemicals for cloud seeding.

In recent years, new formulations of seeding material are being developed for release from pyrotechnic flares (National Research Council, 2003). These materials require less AgI than older formulations, and they are much more active in ice nucleation at temperatures colder than about −5° C. Considerable work to improve the efficiency of seeding materials is being carried out by numerous groups using complex chemical compositions, nanotechnologies, different types of cloud chambers and full-size testing stands of seeding devices. New types of cloud-seeding materials synthesized based on nanotechnologies as a promising water-augmentation technology has drawn attention. Recently there was designed and synthesized a type of core/shell NaCl/TiO2 (CSNT) particle with controlled particle size, which successfully adsorbed more water vapor (~295 times at low relative humidity, 20% RH) than that of pure NaCl, deliquesced at a lower environmental RH of 62-66% than the hygroscopic point (hg·p., 75% RH) of NaCl, and formed larger water droplets ~6-10 times its original measured size area, whereas the pure NaCl still remained as a crystal at the same conditions. It was found that the titanium dioxide coating improved the salt's ability to adsorb and condense water vapor over 100 times compared to a pure salt crystal. Such an increase in condensation efficiency could improve a cloud's ability to produce more precipitation, making rain enhancement operations more efficient and effective. This novel material is suitable to be applied for warm cloud seeding activities.

Due to the increasing interests in cloud seeding and the limitations of the conventional cloud seeding materials there is a need in the art, to synthesize novel alternate cloud seeding materials that can increase the chance of rainfall by increasing the efficiency of rain droplet formation in the cold cloud and minimize the adverse effect on the environment. Further, there is also a need for developing ice-nucleating particles, which can initiate ice nucleation at higher temperatures.

SUMMARY OF THE INVENTION

The present invention introduces nanostructured composite materials for ice nucleation in cold cloud offering excellent in-plane and out-of-plane thermal conductivity which is in favor of ice nucleation of supercooled water. Further, the present invention provides for an ice nucleating particle which when presented in a cold atmospheric condition accelerate and enhance the formation and growth of ice crystals in mixed phase clouds. Furthermore, the present invention also provides for an ice nucleating particle, which can grow rapidly, and continuously with the constant reducing of temperature.

In an embodiment, the present invention provides for an ice nucleating composite comprising for producing a plurality of ice crystals capable of initiating ice nucleation at higher temperature of −8° C. and wherein said ice crystals multiply in number when the temperature increases at or below −8° C.

In a preferred embodiment, the ice nucleating composite is a a three dimensional (3D) porous composite of reduced graphene oxide (rGO) and silicon dioxide nanoparticles, wherein the silicon dioxide nanoparticles are distributed uniformly across a hexagonal reduced graphene oxide (rGO) lattice structure. The composite of the present invention exhibits superior in-plane and out-of-plane thermal conductivity, thereby favoring favor of ice nucleation of supercooled water. wherein said particle exhibits a high water adsorption capacity of 118.86 cm$^3$/g in low humidity conditions. The composite has a high Brunauer-Emmett-Teller (BET) surface area of 178.84 m$^2$/g. The higher value of $a_{s,BET}$ of the composite was attributed to the less restacking of the flexible rGO sheets during the self-assembling process, where SiO$_2$ nanoparticles functioned as spacers which separated the rGO sheets by occupying the interlayer gaps, caused less aggregation and therefore resulted in an increase in the surface area. Additionally, the composite has a low water contact angle of 36.2°, resulting in a higher hydrophilicity. Further, the composite comprises a plurality of pores of about 10-100 nm in size, resulting in a has a pore volume of 1.23 cm$^3$/g.

In another preferred embodiment, the present invention provides for a method of producing the ice nucleating composite. A single-step hydrothermal synthesis was carried out for the synthesis of the ice nucleating composite comprising the following steps. A graphene oxide (GO) aqueous dispersion was prepared. Subsequently, 20 ml of ethanol (C$_2$H$_6$O), 0.7 ml ammonium hydroxide solution (NH$_3$·H$_2$O) and 0.7 ml of Tetraethyl orthosilicate (TEOS) were added into the 15 ml of hraphene oxide solution to form a homogenous mixture. The mixture was sonicated for 30 minutes then transferred into a sealed Teflon-lined autoclave and heated hydrothermally at 180° C. for 12 hours. Under sonication, silica nanoparticles were formed via Stöber process, where TEOS was hydrolyzed in alcohol in the presence of NH$_3$·H$_2$O as a catalyst. The synthesized SiO$_2$ nanoparticles became attached to the GO sheets in the dispersion by forming hydrogen bonds with oxygen-containing groups on GO sheets. The mixture then underwent self-assembly in a hydrothermal process to form a black-colored sponge-like structure of 3-dimensional reduced graphene oxide and silica dioxide nanoparticles (PrGO-SN). After hydrothermal process, formed PrGO-SN composite was washed with deionized water (DI) water three times. The washed PrGO-SN composite was then put into a freezer at ~20° C. overnight and subsequently, the PrGO-SN composite was transferred into freeze dryer at ~100° C. for 24 hours.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which—

DETAILED DESCRIPTION OF THE INVENTION

Figure 1A:
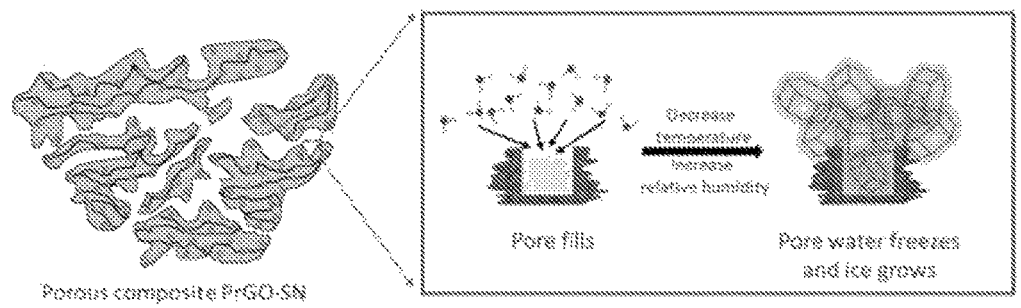
FIG. 1A illustrates a schematic representation of the PrGO-SN composite porous structure that adsorbs and condenses water thereby triggering ice growth from the pores in accordance with an embodiment of the present invention.
Figure 1B:
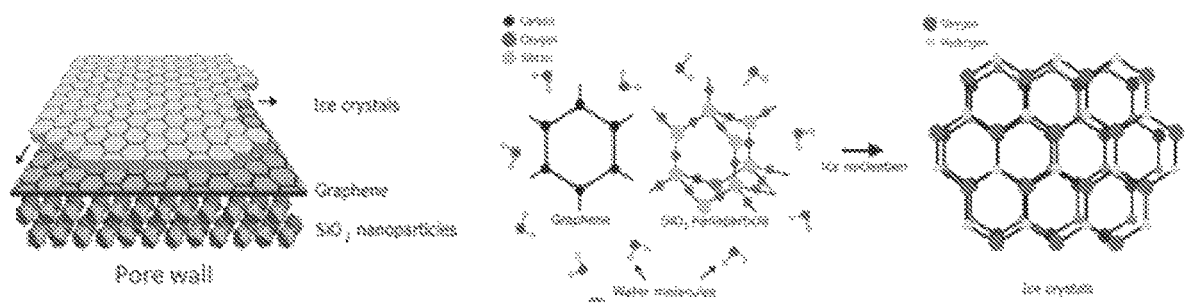
FIG. 1B depicts the ice nucleation mechanism of the PrGO-SN composite in accordance with an embodiment of the present invention.

The aspects of the ice nucleating particle of the present invention will be described in conjunction with FIGS. 1-8. In the Detailed Description, reference is made to the accompanying figures, which form a part hereof, and in which is shown by way of illustration specific embodiments in which the invention may be practiced. It is to be understood that other embodiments may be utilized and logical changes may be made without departing from the scope of the present invention. The following detailed description, therefore, is not to be taken in a limiting sense, and the scope of the present invention is defined by the appended claims.

The present invention introduces nanostructured composite materials for ice nucleation in cold cloud offering excellent in-plane and out-of-plane thermal conductivity which is in favor of ice nucleation of supercooled water. Further, the present invention provides for an ice nucleating particle which when presented in a cold atmospheric condition catalyze and enhance the formation and growth of ice crystals in mixed phase clouds. Furthermore, the present invention also provides for an ice nucleating particle, which can grow rapidly, and continuously with the constant reducing of temperature.

The present invention focusses at designing and synthesizing novel ice nucelating particles for ice nucleation in cold cloud. The invention introduces a porous composite of 3-dimensional (3D) reduced graphene oxide (rGO) and silica dioxide nanoparticles (PrGO-SN) aiming to initiate ice nucleation at higher temperature as well as sustained rapid ice crystal growth.

In an embodiment of the present invention, an interconnected 3D composite structure of PrGO-SN with narrow-sized $SiO_2$ nanoparticles uniformly distributed across the entire rGO structure is produced via a single-step hydrothermal process. This composite promotes enhanced ice nucleation at relatively warm temperature with high ice nucleating activities based on the following hypothesis: 3D-rGO provided templates that facilitated ice crystal growth due to its hexagonal lattice structure; $SiO_2$ nanoparticles enhanced the overall water molecule adsorption capabilities of the PrGO-SN composite and enabled less aggregation of the overall 3D-rGO structure, thus leading to more available sites for ice nucleation as illustrated in FIG. 1A and FIG. 1B.

FIG. 1A illustrates a schematic representation of the PrGO-SN composite porous structure that adsorbs and condenses water thereby triggering ice growth from the pores. FIG. 1B depicts the ice nucleation mechanism of the PrGO-SN composite.

Theoretical consideration of the enhanced ice formation mechanism:

Ice formation involves the processes of nucleation and growth. In the context of heterogeneous ice nucleation, water molecules start to form ice crystal seeds on the surface of INPs, and there are many factors that can influence the performance of ice nucleation. Numerous studies have been trying to analyze the rate of ice nucleation using various fundamental theories, one of which is classical nucleation theory (CNT), a simplified theoretical approach that describes that ice nucleation process. As Eq. 1 shows, the nucleation rate per unit volume J is mainly attributed to the properties of the INPs, including $\rho_1$, the number density of sites for heterogeneous nucleation, $Z_j$, the rate at which a nucleus overcomes the energy barrier and grows into a new phase (also known as Zeldovich factor which depends on $\Delta\varphi^*$ the formation energy of the critical cluster and $N^*$ the number of molecules in the cluster), and $\Delta F^*$, the free energy cost of creating the critical nucleus ($\Delta F^*$ depends on $\theta$ the contact angle and $\xi$ the geometry of the INPs). Other parameters present in Eq. 1 are k the Boltzmann constant and T the temperature.

$$J = \rho_l Z_j * \exp\left(-\frac{\Delta F^*}{kT}\right), Z_j = \sqrt{\frac{\Delta\varphi^*}{3\pi kT(N^*)^2}}, \Delta F^* = \Delta F^*_{HOMO} * f(\theta, \xi) \tag{1}$$

Ice nucleation involves ordering of the water molecules that are rearranged into their favored lattice positions, such as the most common hexagonal ice crystals ($I_h$) where water molecules arranged in layers of hexagonal rings. If the molecular geometry and chemistry of the INP surface is compatible with ice (such as lattice match), then an ice embryo formed on such surface within the liquid phase will have a lower free energy than an independent ice embryo and its growth will be facilitated. Therefore, an efficient nucleating surface would have low free energy of the interface which it forms with ice, which is consistent with Eq. 1 where smaller value of $\Delta F^*$ leads to larger J.

The present invention aims to design and introduce a porous composite of 3-dimensional (3D) reduced graphene oxide (rGO) and silica dioxide nanoparticles (PrGO-SN) composite such that the surface of 3D-rGO serves as a template for ice crystal growth due to its hexagonal lattice structure ($\Delta F^*$ lowering). Further, the presence of $SiO_2$ nanoparticles in the PrGO-SN at the interlayer gaps between rGO sheets allows less aggregation of the overall 3D-rGO structure, thus leading to more available sites for ice nucleation ($\rho_1$ increasing); more importantly, the hydrophilicity of $SiO_2$ nanoparticles also facilitates the collection of water molecules on the rGO surface, which could facilitate sufficient water molecules for sustained rapid growth of ice crystals ($\theta$ lowering). In addition, it is reported that the minimum number of water molecules are necessary for ice nucleation to form a complete icosahedral symmetry of hexagonal geometry, thus more water molecules that are collected by the hydrophilic $SiO_2$ nanoparticles can speed up the onset of ice nucleation and growth. Hence, both components of the PrGO-SN composite have a collective effect of enhancing the ice nucleation rate J.

Besides, the porous structure of the PrGO-SN composite of the present invention also enables liquid water condensation in these pores even below saturation by the inverse Kelvin effect. As Eq. 2 shows, the relative humidity with respect to water ($RH_w$) for a pore to fill is predicted by the Kelvin effect with a negative sign to account for the concave nature of the meniscus:

$$\ln\left(\frac{P_0}{P}\right) = -\frac{4\gamma \cos(\theta) V_l}{DRT} \quad (2)$$

Where $$\frac{P_0}{P}$$

denotes the saturation ratio with respect to water, $\gamma$ is the surface tension of water-vapor interface, $V_l$ is the molar volume of water, D is the pore diameter, 0 is the contact angle of water on the material, R is the gas constant and T is the temperature in Kelvin. Eq. 2 indicates that the narrower the pore width (smaller pore size), the lower the $RH_w$ required for pore condensation to occur. Conversely, the higher the contact angle of water on the material, the higher the $RH_w$ needed for pore filling. On top of the inverse Kelvin effect, the structure and composition of the PrGO-SN composite implied that the hydrophilicity of $SiO_2$ nanoparticles can facilitate the collection of water molecules, and subsequently water molecules can reorganize in hexagonal structure on the rGO surface, which eventually leads to ice nucleation at suitable temperature.

On the other hand, since hydrogen bonds break and reform constantly depending on the thermal fluctuation of the water molecules, the balance between water-water and water-surface interactions is crucial for ice nucleation events, that is, if one type of interactions dominates the other, ice nucleation would not be favored because it would be either too volatile or too stable to trigger ice nucleation. Hence, surface properties are key to enabling and stabilizing ice nucleation. It is noteworthy that the balance between water-water and water-surface interactions is partly influenced by the quantity of water molecules around the PrGO-SN composite; if the quantity is high, then the water-water interaction will be stronger than the water-surface interaction, which would be difficult for water molecules to reorganize into hexagonal structure and form ice. This is supported by the study that the ice nucleation can be enhanced by a huge factor of 10 at the air-water interface than water-water interface. Since $SiO_2$ nanoparticles can capture water vapor due to high water vapor adsorption capabilities and form a thin layer of liquid water on the PrGO-SN composite, there will exist a liquid/solid interface that has a positive bridging effect between water vapor and the solid surface of the composite. Ice nucleation will initiate from the thin water layer and the ice will grow at the expense of the water vapor in air.

Figure 2:
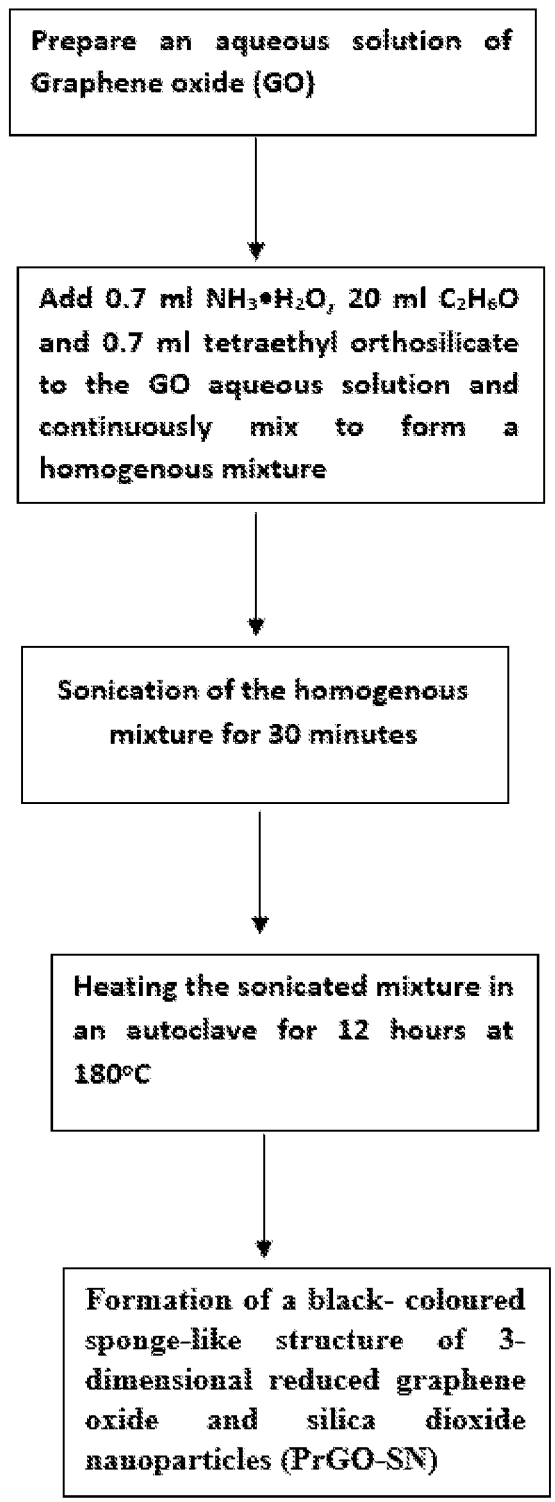
FIG. 2 illustrates a schematic flowchart for the synthesis of PrGO-SN in accordance with an embodiment of the present invention.

Synthesis of the PrGO-SN composite:

The synthesis of PrGO-SN of the present invention is illustrated in FIG. 2. A single-step hydrothermal synthesis was carried out for the synthesis with following details. A GO aqueous dispersion was prepared using the improved Hummers method. 15 ml of GO solution (2 mg/ml concentration) as prepared above (using the Hummers method) was then mixed with 20 ml of ethanol ($C_2H_{6O}$). Subsequently, 0.7 ml ammonium hydroxide solution ($NH_3 \cdot H_2O$) and 0.7 ml and 1.4 ml of Tetraethyl orthosilicate (TEOS) were added into the mixture respectively to prepare 2 separate samples. The mixtures are sonicated for 30 minutes then transferred into a sealed Teflon-lined autoclave and heated hydrothermally at 180° C. for 12 hours. Under sonication, silica nanoparticles were formed via Stöber process, where TEOS was hydrolyzed in alcohol in the presence of $NH_3 \cdot H_2O$ as a catalyst. The synthesized $SiO_2$ nanoparticles became attached to the GO sheets in the dispersion by forming hydrogen bonds with oxygen-containing groups on GO sheets. The mixture then underwent self-assembly in a hydrothermal process to form a black-colored sponge-like structure of 3-dimensional reduced graphene oxide and silica dioxide nanoparticles (PrGO-SN). After hydrothermal process, formed PrGO-SN composite was washed with deionized water (DI) water three times. The washed PrGO-SN composite was then put into a freezer at −20° C. overnight and subsequently, the PrGO-SN composite was transferred into freeze dryer at −100° C. for 24 hours. The ice nucleation performance of the PrGO-SN composite was further determined through in-situ visual observation by Environmental-Scanning Electron Microscope (E-SEM).

Characterization and Measurements:

The synthesized PrGO-SN composite was characterized through Scanning Electron Microscopy (SEM, Quanta 250, FEI Company); Transmission Electron Microscopy (TEM, Tecnai from FEI™ Company operating at 200 KV); A Fourier transform infrared Nicolet iS10 spectrometer (FTIR, Thermo Fisher Scientific, Inc.). Water static-contact-angle Measurements (Kyowa DM-701) elaborated with an interface Measurement & Analyses System and the droplets of 0.8 μl. The water vapor adsorption performance of the PrGO-SN composite was determined quantitatively via a water-vapor adsorption isotherm test (Brunauer-Emmett-Teller, Belsorb Max, Japan) in water-vapor mode. The samples were pretreated at 100° C. for 3 hours under a pressure <$10^{-4}$ Pa before commencing the water vapor adsorption isotherm analysis and the whole test required 24 hours. Environmental scanning electron microscopy (E-SEM) was used for in-situ observation of the ice nucleation activities of the PrGO-SN composite. The water vapor adsorption isotherm analysis confirmed that PrGO-SN sample prepared by 0.7 ml of TEOS had higher water vapor adsorption capacity as shown in FIG. 3.

Figure 3:
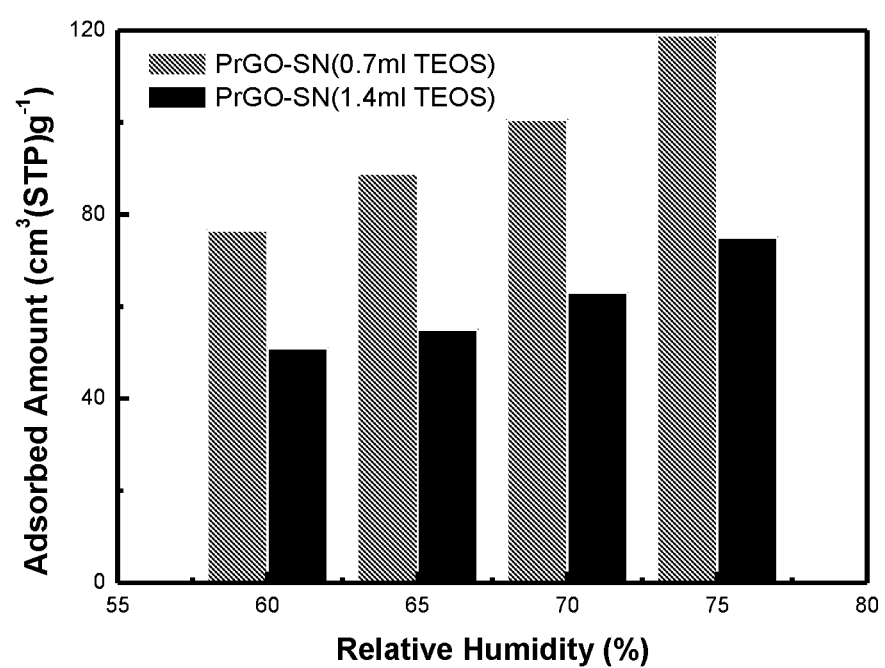
FIG. 3 graphically depicts a comparison of water vapor adsorption capacity of different PrGO-SN composites in accordance with an embodiment of the present invention.

FIG. 3 illustrates a comparison of water vapor adsorption capacity of different PrGO-SN composites. It can be seen from the graph shown in FIG. 3 that at low relative humidity conditions ranging from 60% to 75%, the adsorbed water-vapor volume of the PrGO-SN (0.7 ml TEOS) sample was higher than that of the PrGO-SN(1.4 ml TEOS) sample; as the relative humidity increases, the difference in water vapor adsorption capacity was even larger.

The 3D-rGO/MO materials produced in this invention, when evaluated by micro-scale ice nucleation measurement, show that 3DrGO/SiO2 produced can initiate ice nucleation at −8° C. which is higher temperature than most previous reported materials such as AgI and feldspar. Further, the ice nucleation particle number increased continuously and rapidly with the reducing of temperature.

Figure 4A:
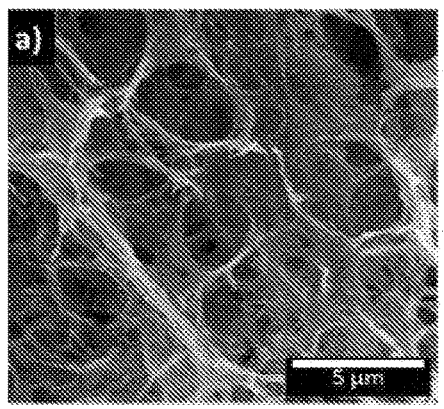
FIG. 4A depicts the SEM image of the rGO sheet in accordance with an embodiment of the present invention.
Figure 4B:
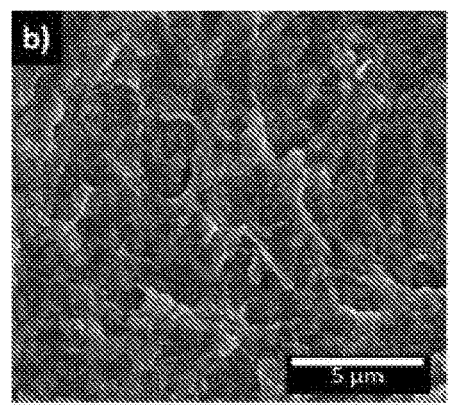
FIG. 4B depicts the SEM image of the PrGO-SN composite where SiO2 nanoparticles were enveloped within the 3D rGO network in accordance with an embodiment of the present invention.
Figure 4C:
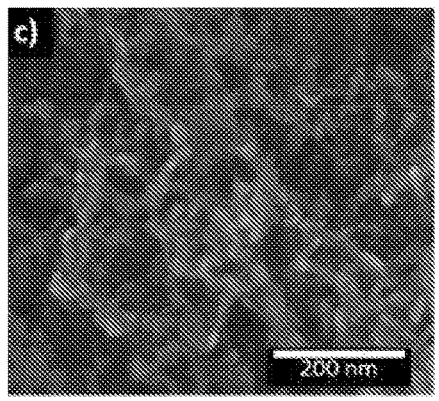
FIG. 4C depicts the SEM image of the PrGO-SN composite where SiO2 nanoparticles were enveloped within the 3D rGO network, when the scale bar is 200 nm in accordance with an embodiment of the present invention.
Figure 4D:
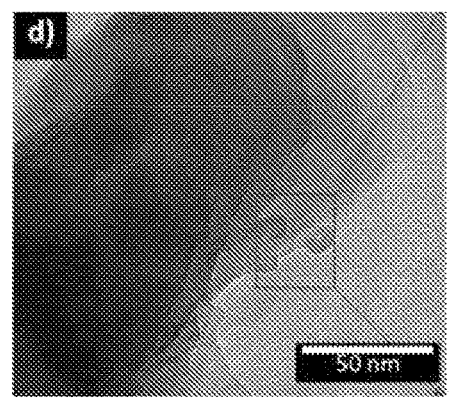
FIG. 4D depicts the TEM image of the PrGO-SN composite in accordance with an embodiment of the present invention.
Figure 4E:
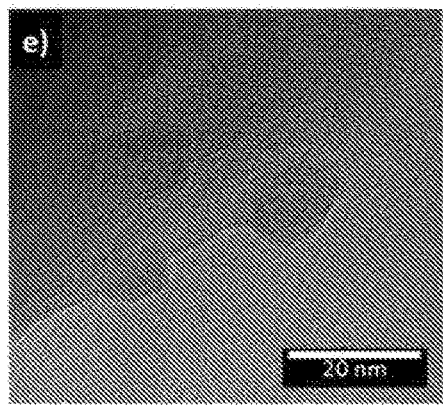
FIG. 4E depicts the structure of SiO2 nanoparticles in accordance with an embodiment of the present invention.

Surface morphology of rGO and the cross-sectional image of the PrGO-SN:

The microscopic surface morphology of rGO and the cross-sectional image of the PrGO-SN composite are shown in FIGS. 4A to 4E. When the GO dispersion underwent hydrothermal process as mentioned above, a well-connected 3D porous structure was formed with many interconnected rGO sheets as shown in FIG. 4A. As for the PrGO-SN composite, the SEM image confirmed that SiO2 nanoparticles were homogeneously embedded in rGO and distributed across almost the entire rGO network as shown in FIG. 4B. The internal structure of the PrGO-SN composite also revealed the overall distribution of SiO2 nanoparticles enveloped within the 3D-rGO network. Further observations under TEM suggested that SiO2 nanoparticles occupied the interlayer gaps between rGO sheets, indicating that the SiO2 nanoparticles played a spacer role in separating the rGO sheets and thus resulted in less aggregation compared to the pristine rGO. FIG. 4D shows different contrasts of rGO sheets and SiO2 nanoparticles, which indicated the co-existence of SiO2 nanoparticles and rGO layers. In addition, it can be found that SiO2 nanoparticles presented in spherical structure with an average size of 10-20 nm as shown in FIG. 4E.

Figure 5:
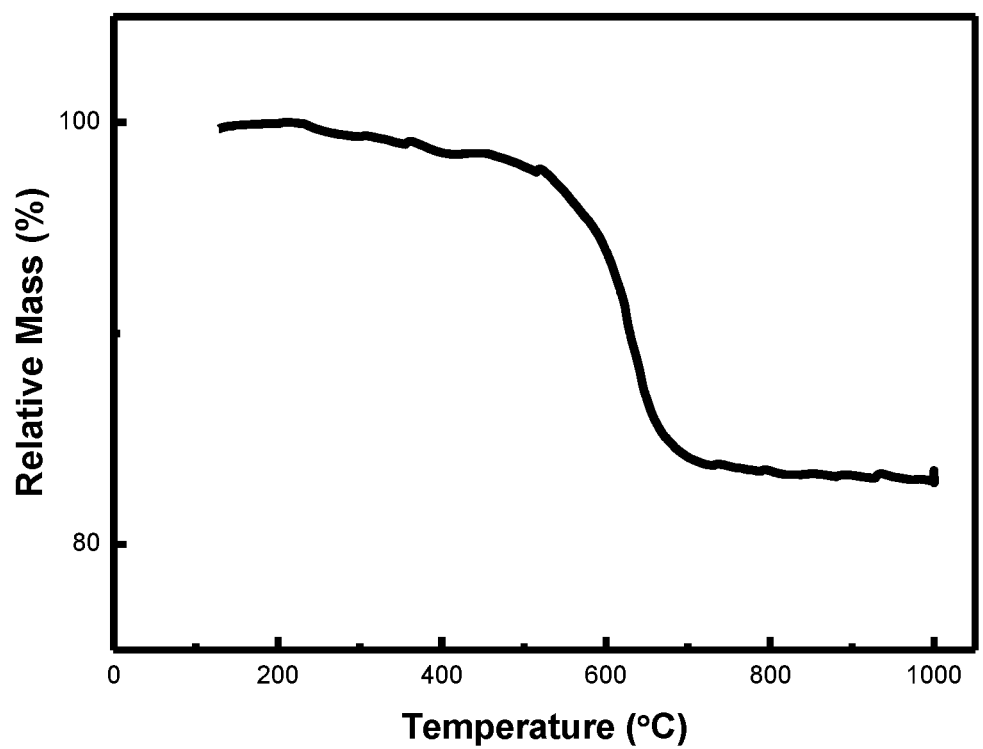
FIG. 5 graphically depicts the Simultaneous thermal analysis (STA) of the relative mass ratio of the PrGO-SN composite in accordance with an embodiment of the present invention.

Furthermore, Simultaneous Thermal Analysis (STA) was conducted to determine the composition of each component in the PrGO-SN composite, and the result indicated that the mass percentage of rGO in the PrGO-SN composite is about 18 wt % as shown in FIG. 5. FIG. 5, depicts the Simultaneous thermal analysis (STA) of the relative mass ratio of the PrGO-SN composite. It is indicated in FIG. 5 that rGO accounted for 18% of the total composite mass. Typically, the mass of composite did not change much until 500° C. Before 500° C., most of the mass loss was due to the evaporation of water molecules inside the composite; after 500° C., carbonaceous materials started to burn, resulting in significant mass loss.

Figure 4F:
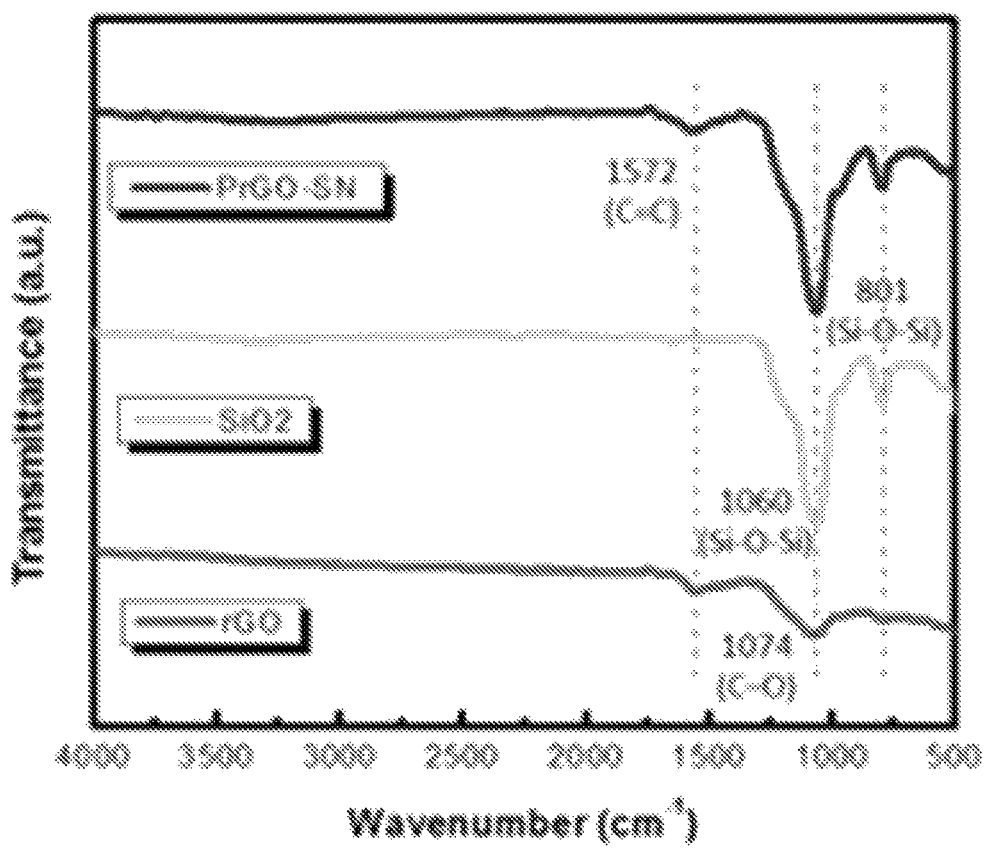
FIG. 4F depicts the FTIR spectra of rGO, SiO2 and the PrGO-SN composite, respectively in accordance with an embodiment of the present invention.

The functional groups of each component of the PrGO-SN composite were confirmed by FTIR (Fourier transform infrared Nicolet iS10 spectrometer) as shown in FIG. 4F. Peaks of C=C, C—O and Si—O—Si from the composite sample confirmed the presence of both rGO and SiO2 nanoparticles. Moreover, the relatively strong peak of the composite at 1060-1075 cm-1 corresponds to the superimposition between the C—O and Si—O—Si peaks. The peaks of —OH and O—H were barely visible (FIG. 3F), implying that most of the oxygen-containing groups were removed during the hydrothermal reaction process. The slightly stronger —OH signal from the PrGO-SN composite than the rGO could result from the presence of silanol groups that normally associated with SiO2 nanoparticles.

Figure 6A:
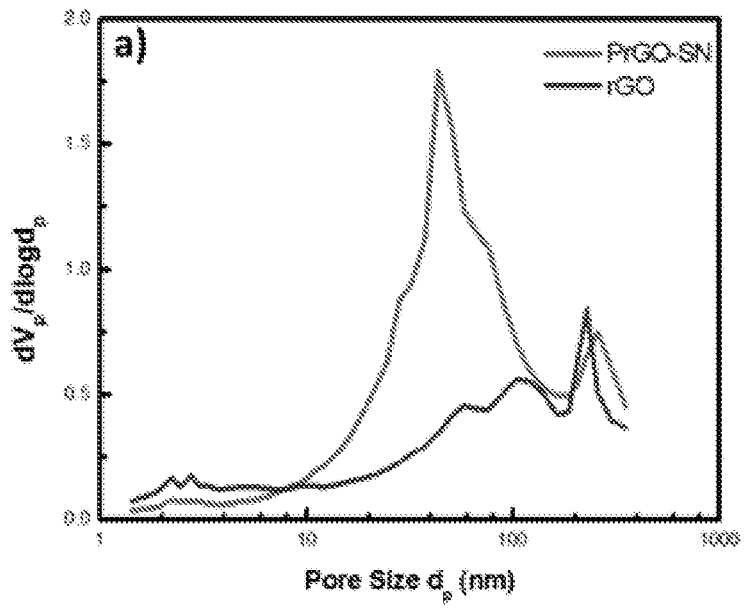
FIG. 6A depicts the pore size distribution of PrGO-SN composite and rGO based on the Barrett-Joyner-Halenda method in accordance with an embodiment of the present invention.
Figure 6B:
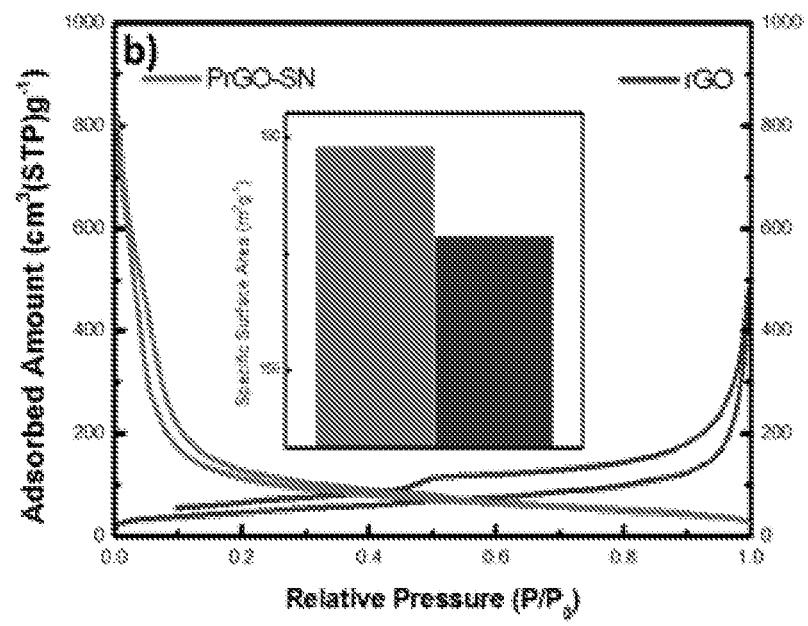
FIG. 6B depicts the specific surface area ($a_{s,BET}$) of rGO and the PrGO-SN composite based on the Brunauer-Emmet-Teller method using N2 adsorption/desorption isotherm in accordance with an embodiment of the present invention.

The pore size distribution and total pore volume of both the PrGO-SN composite and rGO were determined by the Barrett-Joyner-Halenda (BJH) method. As FIG. 6A shows, BJH result demonstrated that the PrGO-SN composite had significantly more pores of size range between 10-100 nm and peaked at around 50 nm compared to rGO which had less pores of larger sizes, suggesting that the co-existence of $SiO_2$ nanoparticles and 3D-GO framework contributed to the formation of smaller pores (10-100 nm) in the composite structure. In addition, the PrGO-SN composite has a total pore volume ($V_p$) of 1.23 cm$^3$/g, compared to that of rGO 0.69 cm$^3$/g. This BJH result indicated that the porosity of the PrGO-SN composite has been greatly increased compared to the rGO. The specific surface area ($a_{s,BET}$) of the rGO and the PrGO-SN composite were determined by the Brunauer-Emmet-Teller (BET) method using $N_2$ adsorption/desorption isotherms with 167.31 m$^2$/g for rGO and 178.84 m$^2$/g for the composite, respectively as shown in FIG. 6B. The higher value of $a_{s,BET}$ of the composite was attributed to the less restacking of the flexible rGO sheets during the self-assembling process, where $SiO_2$ nanoparticles functioned as spacers which separated the rGO sheets by occupying the interlayer gaps, caused less aggregation and therefore resulted in an increase in the surface area.

Figure 6C:
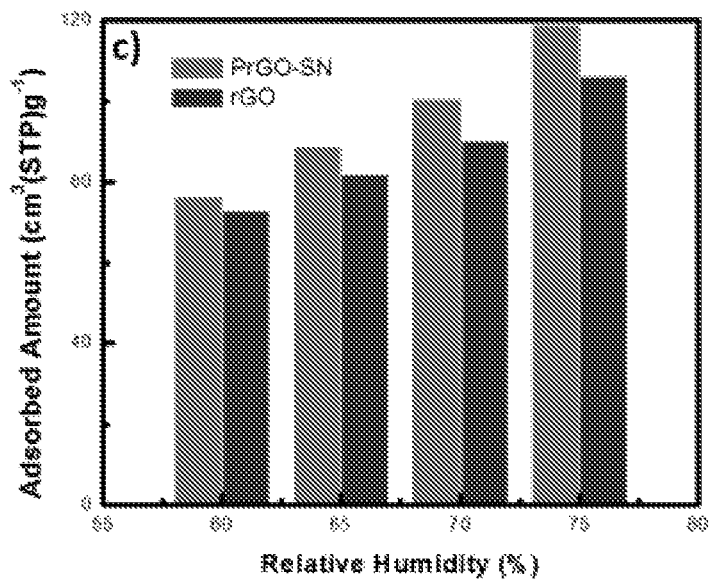
FIG. 6C depicts a water vapor adsorption isotherm of rGO and the PrGO-SN at relative humidity ranging from 60% to 75% in accordance with an embodiment of the present invention.
Figure 6D:
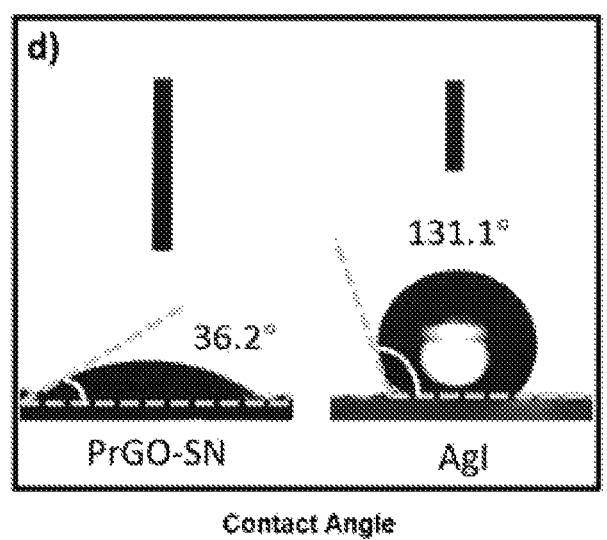
FIG. 6D depicts the water contact angle measurement of the PrGO-SN composite and AgI particles, respectively in accordance with an embodiment of the present invention.

Water-vapor adsorption isotherm analysis was conducted to quantitatively determine the water-vapor adsorption capacity of the PrGO-SN composite compared to the rGO. It was found that, even at low relative humidity conditions ranging from 60% to 75%, the adsorbed water-vapor volume of the composite was higher than that of the rGO [118.86 cm$^3$/g compared with that (105.95 cm$^3$/g) of rGO at 75% R]), which enabled the composite to adsorb more water vapor that potentially contributed to ice nucleation at suitable temperature as shown in FIG. 6C. Although both PrGO-SN composite and rGO demonstrated good water vapor adsorption capacity, it can be inferred that the PrGO-SN composite could adsorb much more water vapor than the rGO at higher RH value. This feature was attributed to both the hydrophilicity of $SiO_2$ nanoparticles and the porous structure of the PrGO-SN composite. Further, the water contact angle of the PrGO-SN composite was determined by deionized water static-contact-angle measurements. The PrGO-SN powder sample was pressed into a plate form through compression molding method, and the measured contact angle of the plate sample was used as approximation for the actual PrGO-SN composite particles. As shown in FIG. 6D, the contact angle of the PrGO-SN composite is as low as 36.2°, thereby confirming its strong hydrophilic property. A low contact angle can lead to higher ice nucleation activities because of the lowering of free energy cost of creating the critical nucleus thereby increasing the water vapor adsorption performance. In comparison, the contact angle of silver iodide (AgI) particles for example, is 131.1°, which shows strong hydrophobic property. Based on the above results and comparisons, PrGO-SN composite sample of the present invention has demonstrated the structure and property of a nanostructured porous materials with higher water vapor adsorption capacity, higher BET specific surface area and lower water contact angles (i.e. more hydrophilic). Such characteristics of PrGO-SN composite are in favor of initiating ice nucleation at an extremely lower critical temperature and vapor pressure in addition to rapid ice crystal growth.

Observation of ice nucleating on PrGO-SN composites:

Environmental scanning electron microscopy (E-SEM) was employed for in-situ observation of the ice nucleation activities of the PrGO-SN composite. For all E-SEM experiments, the supersaturated relative humidity conditions and the sub-zero temperature for the first occurrence of ice nucleation and the subsequent growth were controlled by adjusting the partial pressure of water vapor as well as the temperature in the chamber. Firstly, samples were pretreated in the chamber for 60 min with the temperature of the chamber set at −8° C. and the relative humidity (RH) at ~80%. This pretreatment allows for stabilizing the temperature and relative humidity conditions. Secondly, RH in the chamber was gradually increased at a constant rate (~5 Pa/s) until first ice nucleation events were observed, and the RH stopped increasing and was kept constant; meanwhile ice crystal growth progressed rapidly at this RH value. Multiple experiments were performed under such procedures and it was found that the RH value at which first nucleation event was observed ranged from 5% to 8% supersaturation. Same procedures were followed at even higher temperature of −7 and −6° C., but no ice nucleation events were observed regardless of the increase in RH. Therefore, −8° C. was determined as the highest and optimal ice nucleation temperature for the PrGO-SN composite. It is noteworthy that no water droplet was found at any stage throughout the E-SEM experiments, indicating that the water vapor was transformed directly into ice crystals.

Figure 7A:
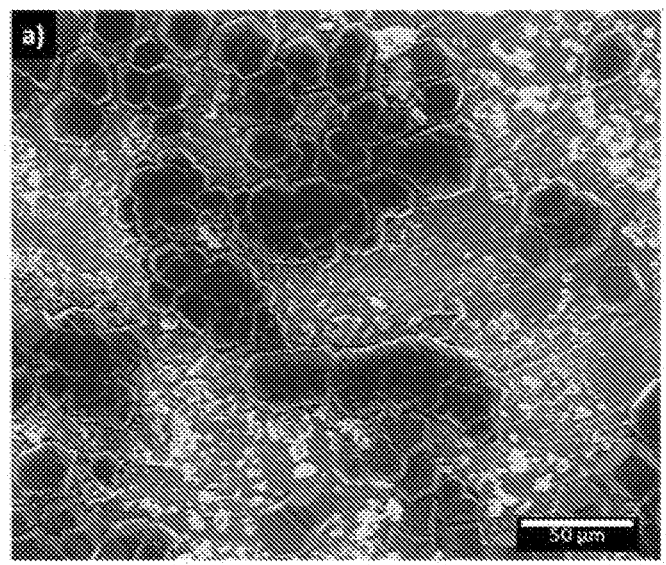
FIG. 7A depicts the ice nucleation activities of the PrGO-SN composite observed by E-SEM experiments under controlled temperature and water vapor pressure conditions in form of hexagonal ice crystals in accordance with an embodiment of the present invention.
Figure 7B:
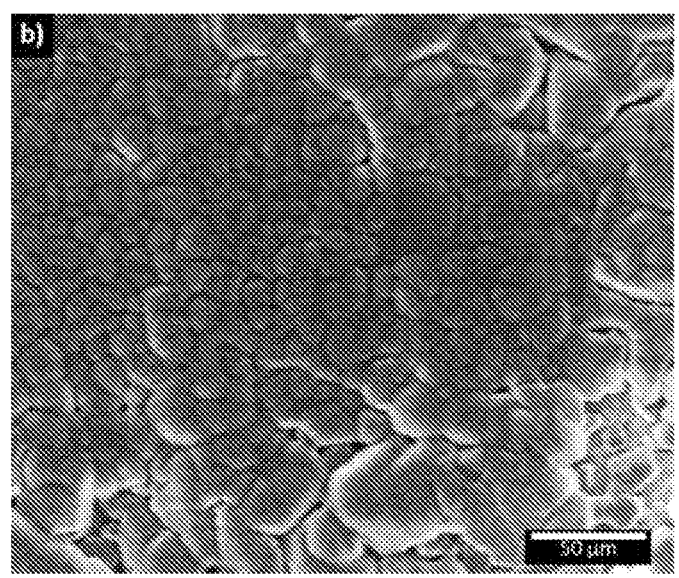
FIG. 7B depicts the ice nucleation activities of the PrGO-SN composite observed by E-SEM experiments under controlled temperature and water vapor pressure conditions in form of bulk ice in accordance with an embodiment of the present invention.

E-SEM experiments showed that, under the same conditions, PrGO-SN composite-induced ice nucleation resulted in two different appearances of ice crystals: 1) those that tended to grow into individual hexagonal crystals; and 2) those merging with each other and forming bulk ice, as depicted in FIGS. 7A and 7B respectively. This phenomenon suggested that different surface features of the PrGO-SN composite may have different influence on ice nucleation and growth. To further analyze such phenomenon, regions of the PrGO-SN composite with different morphologies were carefully observed by E-SEM observation: one with apparent topographic roughness such as large cavities on the surface, the other with relatively smooth surface absent of large cavities, as shown in FIG. 7C and FIG. 7D, respectively.

Figure 7C:
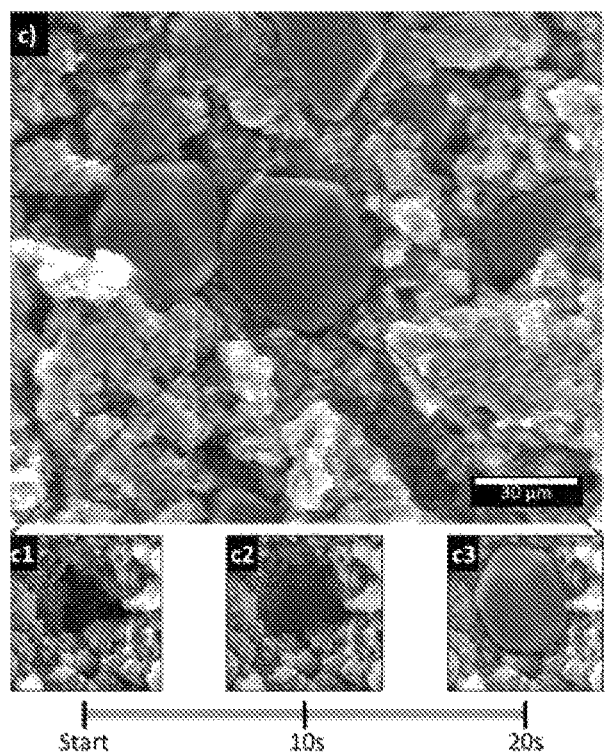
FIG. 7C depicts the different ice formation patterns in the rough region with cavities in accordance with an embodiment of the present invention.
Figure 7D:
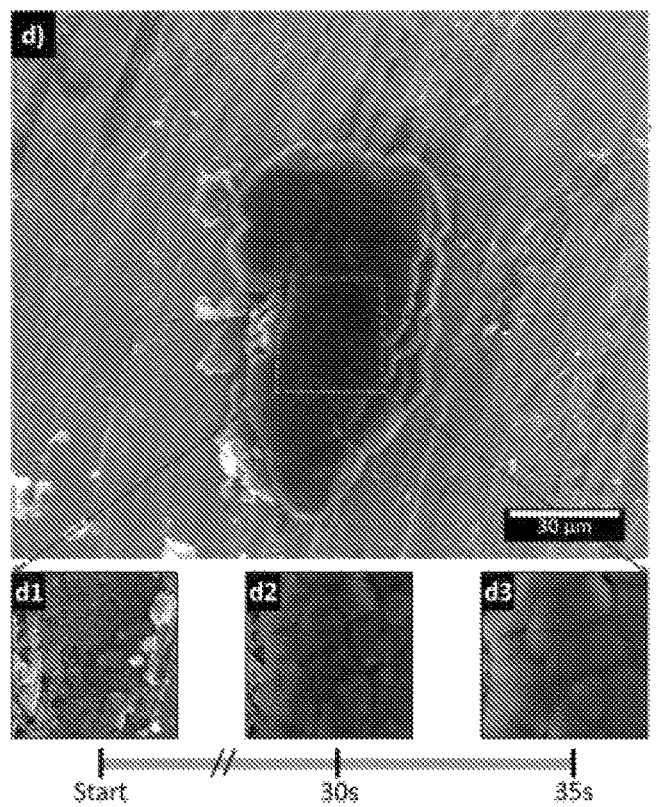
FIG. 7D depicts the different ice formation patterns in the smooth region in accordance with an embodiment of the present invention.

As shown in FIG. 7C, when RH reached ~5% supersaturation, first ice nucleation event took place on the sample regions with large cavities and then started to grow within ~10 s from the beginning of the experiment (c2). When RH increased to ~8% supersaturation and ~20 s into the experiment, ice crystals grew larger and displayed visible hexagonal shape in the cavity of the sample (c3). In comparison, FIG. 7D shows that ice nucleation was only observed on the sample regions with smooth surface until the conditions reached ~8% supersaturation and ~30 s from the beginning of the experiment (d2). However, in the later sample, once the ice crystals were formed, spontaneous ice growth occurred and ice crystals covered almost the entire surface of the sample within a short period of time (only ~5 s) from the first ice nucleation event (d3). It is noteworthy that for both scenarios, the nucleated ice crystals can sustain their growth at constant RH.

Figure 8A:
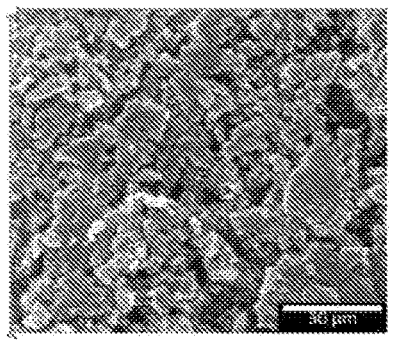
FIGS. 8A-8C shows additional E-SEM images of showed different ice formation patterns of of the PrGO-SN composite in rough region with cavities in accordance with an embodiment of the present invention.
Figure 8B:
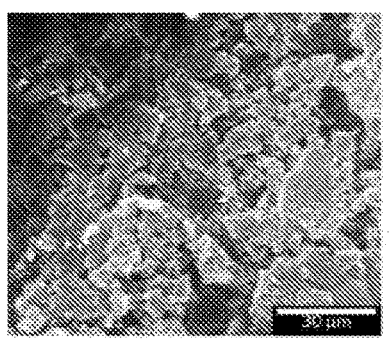
Figure 8C:
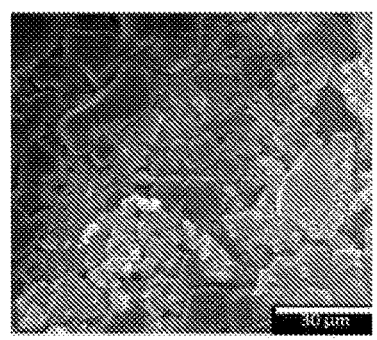
Figure 8D:
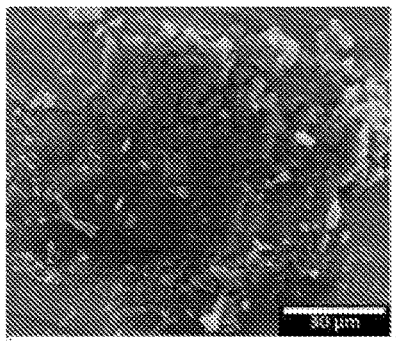
FIGS. 8D-8F shows additional E-SEM images of showed different ice formation patterns of of the PrGO-SN composite in the smooth region in accordance with an embodiment of the present invention.
Figure 8E:
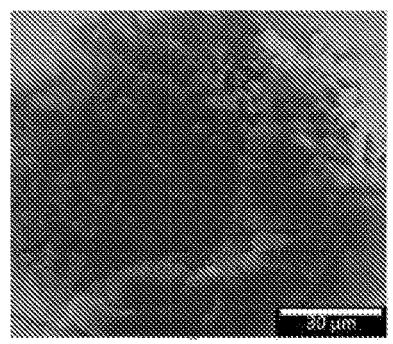
Figure 8F:
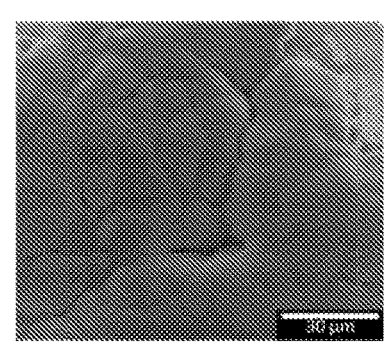

Further, multiple E-SEM ice nucleation experiments were conducted, and more SEM images of ice nucleation events in rough region with cavities as shown in FIGS. 8A-8C; and relatively smooth region as shown in FIGS. 8D-8F respectively. As it can be seen from FIGS. 8A-8C, the E-SEM experiments showed different ice formation patterns in rough region with the presence of cavities. Alternatively, it can be seen from FIGS. 8D-8F the ice formation patterns in the smooth region is in form of hexagonal ice crystals and bulk ice.

It can be found that for the rough sample regions with large cavities, ice nucleation could be incepted on such large cavities and grown into hexagonal shape ice crystals (FIG. 7C). In the case of sample with relatively smooth regions, simultaneous ice nucleation occurred at multiple sites, and the formed ice crystals tended to merge and form large chunks of ice as can be seen from FIG. 7D The differences in ice crystal growth behaviors were affected by the regions with different surface roughness. In general, topographic roughness on the PrGO-SN composite tended to favor condensations of vapor into liquid. Specifically, in the case of porous composite of PrGO-SN, rough regions with larger surface areas possess cavities and more small pores than relatively smooth regions. As a result, condensed water vapor would be accumulated first in the cavities on the PrGO-SN composite, thus these locations would have higher ice nucleation activities due to the confined nucleation sites and sufficient water vapor uptake. On the other hand, relatively smooth PrGO-SN region tended to adsorb water vapor more homogeneously, thus ice nucleation tended to occur at multiple sites simultaneously; however, due to the competition of condensed water vapor among the neighboring sites, ice nucleation would take longer time to be observed visually. Once the ice nucleation event occurred at multiple sites, the formed small ice crystals would quickly merge together to form bulk ice). By observing the ice nucleating on PrGO-SN composites using the temperature/water-vapor-pressure controlled E-SEM, it was founded that the porous composite of PrGO-SN demonstrated the initiation of ice nucleation at higher temperature as well as continuous rapid ice crystal growth, which showed potential as a promising candidate for ice nucleation materials.

The 3DrGO/SiO2 produced in the present invention exhibit various advantages over standard ice nucleating materials. First advantage is the 3D reduced graphene oxide framework offers excellent in plane and out-of-plane thermal conductivity, which is in favor of ice nucleation of super cooled water. Second advantage is the highly porous and hydrophilic $SiO_2$ nanoparticle contribute in adsorbing the free-moving water molecules and assisting in achieving the fixed and packed orientation of water molecules in order to form the ice. Both positive factors possessed by the 3D-rGO/SiO2 have not been achieved by standard ice nucleating particles.

The present invention aims at designing a nanostructured porous composite of 3-dimensional reduced graphene oxide and silica dioxide nanoparticles (PrGO-SN). An interconnected 3D composite structure of PrGO-SN with narrow-sized $SiO_2$ nanoparticles uniformly distributed across the entire rGO structure was produced via controlled single-step hydrothermal process. The PrGO-SN composite not only offered hexagonal ice crystal growth via lattice match between the ice and crystalline structure of the substrate that may induce heterogeneous ice nucleation from its 3D rGO component, but also provided high Brunauer-Emmett-Teller (BET) surface area and water vapor adsorption capacity. In addition, PrGO-SN composite has good porosity and more hydrophilic surface from its $SiO_2$ nanoparticles component which were all suitable factors to promote ice nucleation and growth. In-situ observations via an Environmental-Scanning Electron Microscope (E-SEM) confirmed the enhanced ice nucleation performance of the PrGO-SN composite evidenced by visible ice nucleation event starting from −8° C., 5-8% RH supersaturation. In addition, it was founded that ice nucleation was incepted on large cavities in the rougher region of the PrGO-SN composite sample and grew into hexagonal shape ice crystals. Alternatively, ice nucleation event occurred simultaneously at multiple sites in a smoother region of the sample, then merged rapidly together to form bulk ice. By observing the ice nucleating on PrGO-SN composites under E-SEM, it was confirmed that the porous composite of PrGO-SN demonstrated the initiation of ice nucleation at higher temperature as well as continuous rapid ice crystal growth.

Many changes, modifications, variations and other uses and applications of the subject invention will become apparent to those skilled in the art after considering this specification and the accompanying drawings, which disclose the preferred embodiments thereof. All such changes, modifications, variations and other uses and applications, which do not depart from the spirit and scope of the invention, are deemed to be covered by the invention, which is to be limited only by the claims, which follow.

The invention claimed is:

1. An ice nucleating composite for producing a plurality of ice crystals, wherein said composite is an interconnected 3D porous composite of reduced graphene oxide (rGO) sheets and silicon dioxide nanoparticles, and the silicon dioxide nanoparticles occupy gaps between the rGO sheets, and the composite initiates ice nucleation at a temperature of −8° C.; and wherein said composite multiplies the ice crystals in number when the temperature decreases at or below −8° C.

2. The ice nucleating composite of claim 1, wherein the silicon dioxide nanoparticles are distributed uniformly across a hexagonal reduced graphene oxide (rGO) lattice micro-structure.

3. The ice nucleating composite of claim 1, wherein said composite exhibits a high water adsorption capacity of 118.86 cm$^3$/g in low humidity conditions.

4. The ice nucleating composite of claim 1, wherein said composite has a high Brunauer-Emmett-Teller (BET) surface area.

5. The ice nucleating composite of claim 1, wherein said composite has a low water contact angle.

6. The ice nucleating composite of claim 1, wherein said composite comprises a plurality of pores of about 10-100 nm in size.

7. The ice nucleating composite of claim 1, wherein said composite has a high pore volume.

8. A process for preparing an ice nucleating composite the process comprising the steps of:
preparing an aqueous dispersed graphene oxide solution;
adding the aqueous solution of graphene oxide to ethanol, ammonium hydroxide and tetraethyl orthosilicate forming a homogenous mixture;
sonicating the homogenous mixture to obtain a sonicated mixture;
heating the sonicated mixture in an autoclave for hydrothermal synthesis thus obtaining the ice nucleating composite of an interconnected 3D porous composite of reduced graphene oxide (rGO) sheets and silicon dioxide nanoparticles;
rinsing the ice nucleating composite with deionised water; and
freeze-drying the composite to preserve the 3D microstructure.

9. The process of claim 8, wherein the concentration of graphene oxide solution was 2 mg/ml.

10. The process of claim 8, wherein 20 ml of ethanol was added to the aqueous solution of graphene oxide.

11. The process of claim 8, wherein 0.7 ml of ammonium hydroxide was added to the aqueous solution of graphene oxide.

12. The process of claim 8, wherein 0.7 ml of tetraethyl orthosilicate was added to the aqueous solution of graphene oxide.

13. The process of claim 8, wherein the homogenous mixture comprising the aqueous solution of graphene oxide, ethanol, ammonium hydroxide and tetraethyl orthosilicate is sonicated at room temperature for at least 30 minutes.

14. The process of claim 8, wherein the sonicated mixture is heated in a Teflon lined, sealed autoclave.

15. The process of claim 8, wherein the sonicated mixture is heated at 180° C. for at least 12 hours for hydrothermal synthesis.

16. The process of claim 8, wherein the ice nucleating composite is washed with deionised water at least three times.

17. The process of claim 8, wherein the ice nucleating composite is frozen in a freeze dryer at −100° C. for at least 24 hours.

* * * * *